(No Model.) 4 Sheets—Sheet 1.
P. WEBER.
FRICTION CLUTCH.

No. 482,491. Patented Sept. 13, 1892.

Fig. 1.

Attest:
Geo H Botts
J J Kennedy

Inventor:
Peter Weber
By Philipp, Munson, Phelps & Henry
Attys (No Model.) 4 Sheets—Sheet 2.

P. WEBER.
FRICTION CLUTCH.

No. 482,491. Patented Sept. 13, 1892.

(No Model.) 4 Sheets—Sheet 3.
P. WEBER.
FRICTION CLUTCH.

No. 482,491. Patented Sept. 13, 1892.

UNITED STATES PATENT OFFICE.

PETER WEBER, OF SCHENECTADY, NEW YORK.

FRICTION-CLUTCH.

SPECIFICATION forming part of Letters Patent No. 482,491, dated September 13, 1892.

Application filed July 22, 1891. Serial No. 400,291. (No model.)

*To all whom it may concern:*

Be it known that I, PETER WEBER, a citizen of the United States, residing at Schenectady, county of Schenectady, and State of New York, have invented certain new and useful Improvements in Friction - Clutches, fully described and represented in the following specification and the accompanying drawings, forming a part of the same.

This invention relates to improvements in that class of clutches commonly called "friction-clutches," in which a mechanism to be driven is connected to a driving mechanism by frictional engagement between the two members of the clutch, produced by the movement of one member of the clutch into contact with the other member.

The present invention has for its object, primarily, the provision of what will be hereinafter termed a "tightening mechanism," which is operated when slip occurs between the two members of the clutch and which when thus operated in turn operates through connections between it and the clamping mechanism of the clutch to increase the friction between the contacting or pressing surfaces of the two members of the clutch until a point is reached therein at which slip ceases, when the tightening mechanism will no longer be operated to further increase such friction.

The invention also has for its object the provision of an improved friction-adjusting mechanism which, acting through the usual clamping mechanism of the clutch or through clamping mechanism specially provided for the purpose, will at a single operation and from a single point simultaneously and uniformly adjust all portions of the two members of the clutch which make contact with each other in clamping of the clutch to and from each other to secure desired degrees of friction. This adjusting mechanism will be operative not only by hand, but preferably, also, by the tightening mechanism before referred to, the adjusting mechanism in that case forming part of the connections between the tightening mechanism and the clamping mechanism of the clutch.

The invention also includes improvements in the clamping mechanism and in the driving and driven members of the clutch, whereby, among other things, the wear and tear of these parts is materially reduced.

The invention also includes devices for rendering the tightening mechanism inoperative when the contacting portions of the two members of the clutch are out of or being moved out of clutching position, these devices consisting in their preferred form of connections between the shifting mechanism—*i. e.*, the mechanism for shifting the clamping mechanism to and out of clamping position—and the tightening mechanism, which, upon the movement of said shifting mechanism to unclamping position, render said tightening mechanism inoperative either simultaneously with or shortly before (preferably the latter) the completion of the movement of the clamping mechanism to unclamping position, connections being also provided for restoring the tightening mechanism to operative position after the movement of the clamping mechanism to clamping position.

Other improvements in details of construction and combinations of parts will appear in the detailed description, which will now be given in connection with the accompanying drawings, and will be pointed out in the claims.

In the accompanying drawings the tightening mechanism is shown upon what will be hereinafter referred to as the "driven member" of the clutch and as operated from the driving member, and the adjusting and clamping mechanisms are also shown upon this member. It will be understood, however, that the driving member of these drawings may become the driven and the latter the driving member.

In said drawings, Fig. 3 is a section on the line 3 3 of Fig. 1. Fig. 4 is a view similar to Fig. 3, the tightening mechanism of that figure and the preceding figures, however, being omitted. Figs. 5 and 6 illustrate a modification in the tightening mechanism which will be hereinafter referred to.

Figure 1:
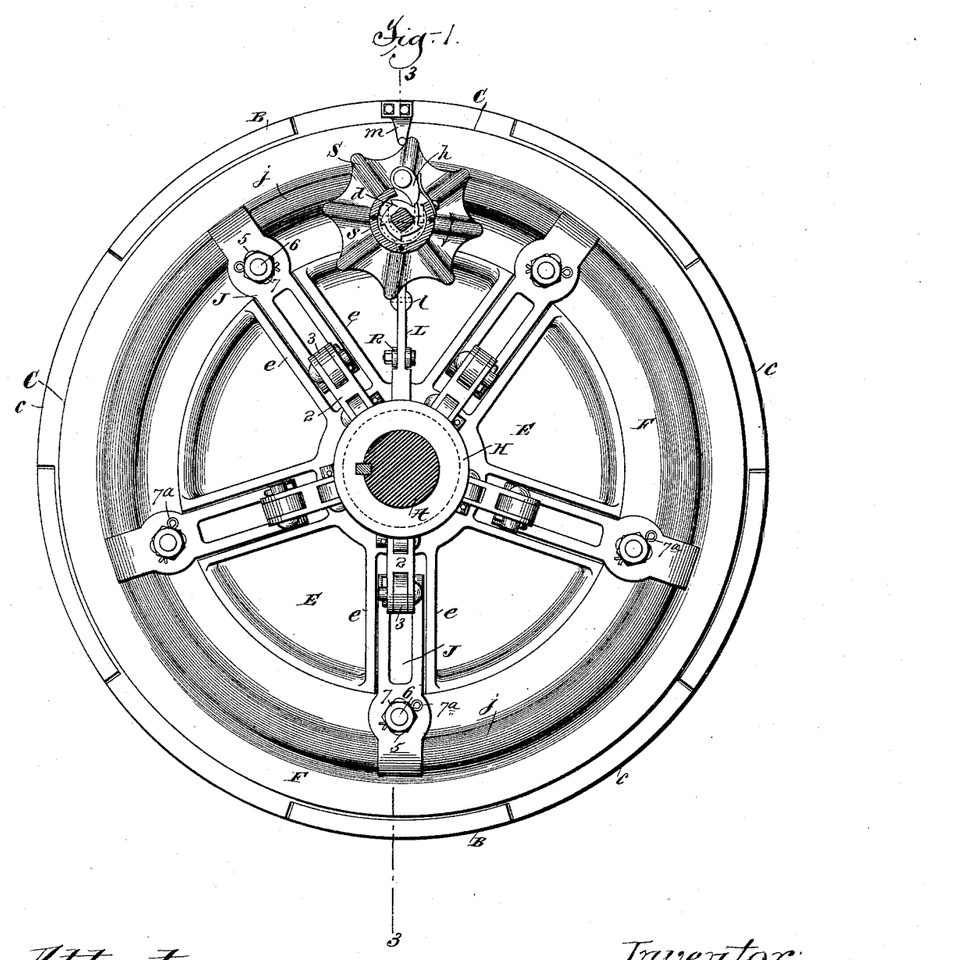
Figure 1 is a side elevation of a clutch embodying the improvements of the present invention.
Figure 2:
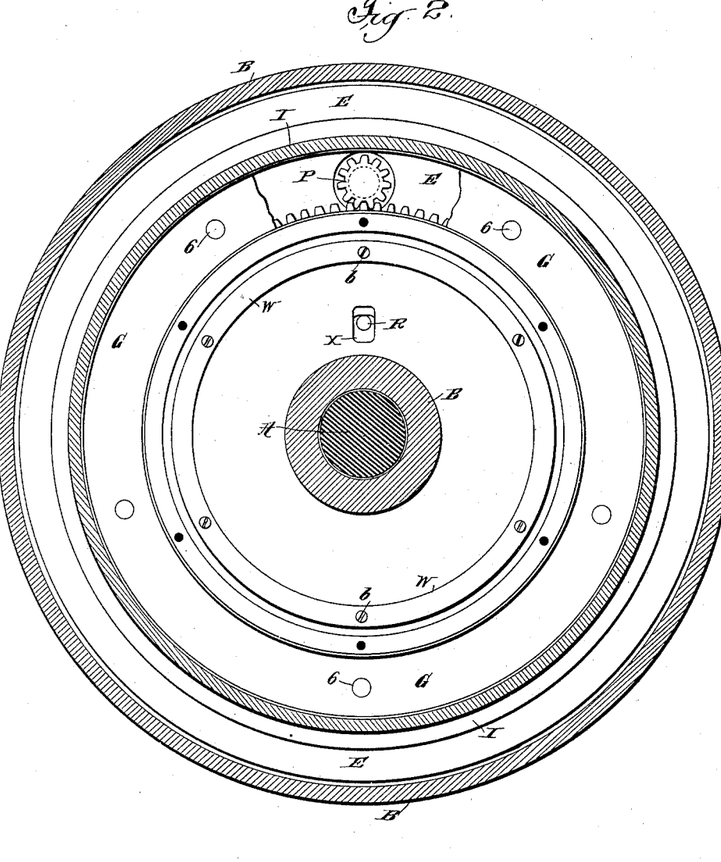
Fig. 2 is a section on the line 2 2 of Fig. 3.
Figures 3, 4, 5, 6:
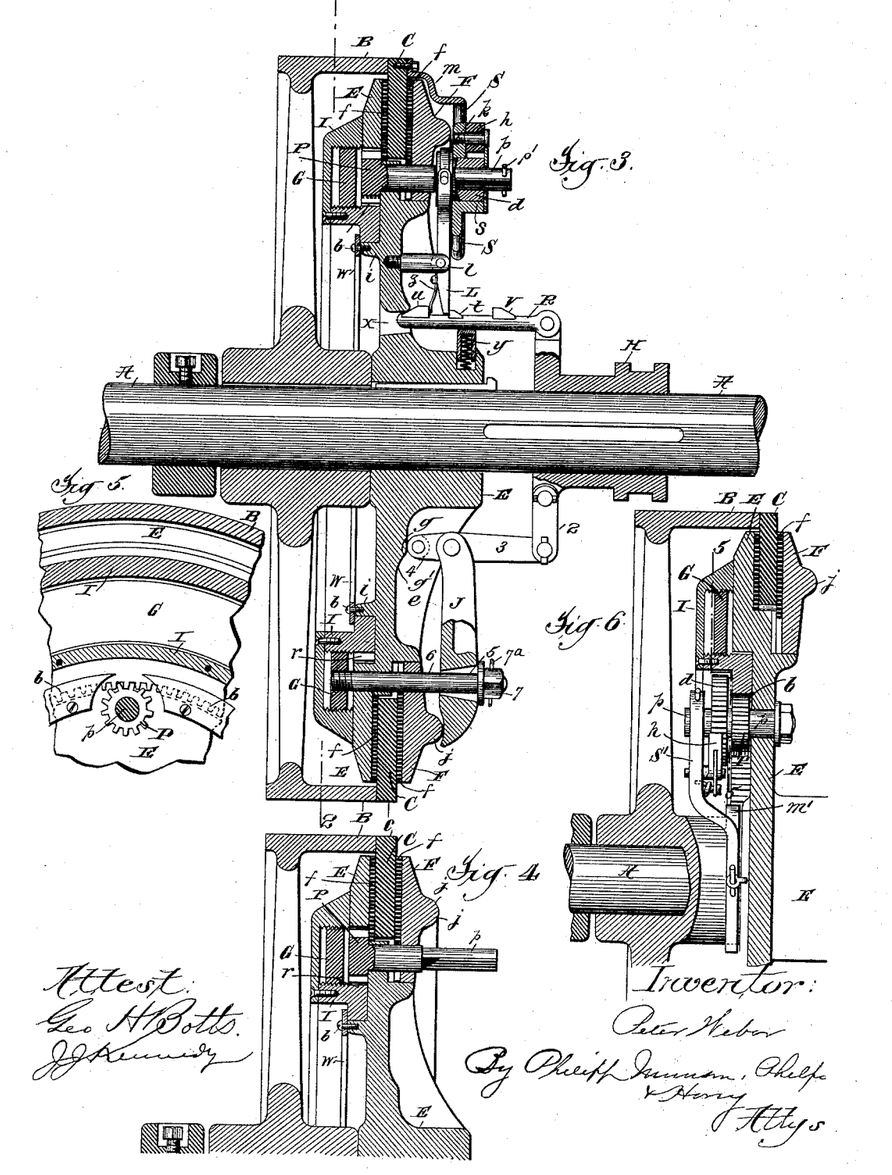

Referring to Figs. 1 to 3, it will be understood that A represents a shaft to be driven, upon which is loosely mounted a pulley B, driven from any suitable source of power. The shaft A has keyed or otherwise secured to it a disk E, which, as will hereinafter appear, carries the clamping mechanism, the adjusting mechanism, and the slip-operated tightening mechanism of the present invention. The pulley B carries a plate C, which is embraced upon its inner side by the disk E and upon its outer side by a ring F, capable of movement to and from said plate by the clamping mechanism, as will hereinafter appear. The pulley B and the plate C may be connected together in any suitable manner; but, as shown and as preferred, this connection consists of dovetails $c$ upon the plate C, fitting in corresponding recesses in the rim of the pulley B and held therein by bolts passing through the plate C and into the pulley B. The contiguous faces of the disk E, plate C, and ring F, just described, provide the surfaces of the clutch which make contact with each other to connect pulley B and shaft A, and between these surfaces are interposed loose friction-rings $f$, of wood, fiber, &c., as shown.

The clamping of the two members of the clutch is effected by means of the clamping mechanism, which will now be described. This clamping mechanism, as shown herein, consists, briefly, of a plurality of toggle-levers 2 3, a lever J for each of said toggle-levers, and a bolt 6 for each lever J, engaging the outer face of the latter and extending inwardly through disk E, and at its inner end bearing indirectly against the inner face of disk E. A more detailed description of the construction and operation of this clamping mechanism thus outlined will now be given. Each arm 2 of the toggle-levers is pivoted at its inner end to a sleeve H, splined to the shaft A and capable of movement longitudinally thereof to and from the disk E for shifting the clamping mechanism to or out of clamping position, and each arm 3 is in turn pivoted at one end to its respective arm 2, and at its inner end is provided with a bowl or roller 4, resting against the face of the disk E, within a pair of ribs $e$, formed in the face of said disk. The disk E is also provided within each pair of ribs with a cam $g$, engaging the bowl or roller 4 of the arm 3 in clamping, and with a deep recess $g'$ at the base of said cam for receiving said bowl or roller in the unclamping position of the clamping mechanism. It will be observed from the foregoing that all the portions of the clamping mechanism and the disk E which make contact present rounded smooth surfaces to each other, thus minimizing the friction between these parts, and as a result considerably reducing the wear and tear of the same.

To the arms 3 are pivoted the levers J, before referred to, the outer ends of which rest against a rib $j$, formed in the face of the ring F, as best shown in Fig. 3, and each lever J is provided at or about midway of its length with an opening 5, through which is passed one of the bolts 6, these bolts being all connected at their inner ends to a ring G upon the inner face of the disk E. At their outer ends the bolts 6 are provided with nuts 7, which bear against the outer sides of the levers J and form the fulcra for said levers when operated, as hereinafter described, by the toggle-levers 2 3 to clamp the two members of the clutch. The nuts 7 are secured to the bolts 6 by split pins $7^a$, passed through the nuts 7 and through holes drilled in the bolts 6 at points equidistant in each bolt from the ring G.

The operation of the clamping mechanism is as follows: To clamp the two members of the clutch, the sleeve H is moved away from the disk E in the usual way, thereby straightening out the toggle-levers 2 3 and causing the bowls or rollers 4 of the arms 3 of these levers to ride up the cams $g$ inwardly toward the hub of the disk E. As this movement is continued the arms 3 are forced away from the disk E by the cams $g$, thereby rocking outward the inner ends of the levers J, the outer ends of which are correspondingly moved inward against the rib $j$ of the ring F. The levers J when thus moved force the ring F and plate C (the pulley B being capable of movement longitudinally of the shaft A) inwardly toward the disk E, thereby tightly compressing the loose rings $f$ and clutching the disk E to the pulley B.

The mechanism for adjusting the friction between the two members of the clutch will now be described. This friction-adjusting mechanism consists, briefly, of a cog-wheel I, connected to all of the clamping devices through the ring G, to which the bolts 6 of these clamping devices are connected, as before described. This cog-wheel I has a bearing upon a shoulder $i$, formed upon the inner face of the disk E and is capable of being rotated thereon by hand or automatically by the tightening mechanism of the clutch, as will hereinafter appear. The cog-wheel I is held in place upon the shoulder $i$ by a washer $w$, bolted to the face of the shoulder, but capable of being loosened to permit the removal of the friction-rings $f$, when after continued use such rings have become so worn as to render it desirable to replace them with new rings. As best shown in Figs. 3 and 4, the cog-wheel I is threaded upon its interior to receive the correspondingly-threaded inner and outer peripheries of the ring G, before referred to, which upon the rotation of wheel I moves axially of the clutch to or from disk E, carrying with it the bolts 6. The cog-wheel I is, as shown, provided with an extension engaging the inner face of the disk E opposite the rib $j$ in the ring F.

The mechanism for operating the cog-wheel I consists of a pinion P, the shaft $p$ of which is journaled in the disk E and extends through and beyond the outer face of the ring F. The outer end of the shaft $p$ is squared for the reception of a hand-wrench when it is desired to operate the pinion by hand and rotate the cog-wheel I for the adjustment of the friction between the pressing-surfaces.

The operation of the adjusting mechanism just described for obtaining desired degrees of initial friction between the pressing-surfaces of the clutch is as follows: When it is desired to increase the friction between these pressing-surfaces, all that is necessary to be done is to rotate the pinion P, by means of a hand-wrench, in the direction of the arrow in Fig. 1. As the pinion P is thus rotated it will, by its engagement with the cog-wheel I, correspondingly rotate the latter, and the ring G, by its engagement with said cog-wheel, will be moved away from the disk E into the cog-wheel I, drawing with it the bolts 6, thus moving the levers J to such position relatively to the disk E and plate C as to cause said levers to bear more strongly against the ring F when operated by the toggle-levers 2 3, and thus increase the friction between the pressing-surfaces. To decrease the friction between the pressing-surfaces, the pinion P will be rotated in the opposite direction, the cog-wheel I being correspondingly rotated and the ring G moved toward the disk E, thereby withdrawing the bolts 6 from the cog-wheel I and moving the levers J upon the ring F in the opposite direction. It will thus be seen that the friction between the pressing-surfaces may be adjusted with great nicety, the adjusting mechanism by which this result is produced being operated from one point, and upon its operation adjusting the friction between the pressing-surfaces simultaneously and uniformly at all points. It may sometimes happen, however, as it frequently does in the common forms of friction-clutches, that the friction created between the pressing-surfaces by the operation of the clamping mechanism will not be sufficient to drive the load upon the driven member, and as a consequence "slip" will occur between the two members of the clutch. It is the primary object of the present invention to overcome this objection and to utilize this slip for the operation of tightening mechanism, which, as shown herein, acting upon the adjusting mechanism which has been described, will through it operate the clamping mechanism to increase the friction between the pressing-surfaces until a point is reached at which slip ceases and the two members of the clutch travel at the same speed. Briefly, this tightening mechanism consists, as shown herein, of a lever and a pawl-and-ratchet mechanism operated thereby, which, when slip occurs between the pressing-surfaces, operating through the pinion P, rotates the cog-wheel I in the manner before described when operated by hand. This mechanism and the connections between it and the clamping mechanism, together with the device or devices by which the tightening mechanism is operated from the driving member, will now be more particularly described. Referring particularly to Fig. 3, it will be seen that the shaft $p$, carrying the pinion P, has mounted upon its outer end a sleeve $s$, having a squared interior corresponding to the squared exterior of the shaft $p$ and provided, as best shown in Fig. 1, with a ratchet $d$, composed of any desired number of teeth engaged by a pawl $h$, carried by a star-wheel or lever S, mounted loosely upon the sleeve $s$, so as to rotate freely thereon in either direction. The star-wheel or lever S, in the position in which it is shown in the drawings with relation to the pulley B, is within the line of rotation of and will when the speed of rotation of the pulley B exceeds that of the disk E be engaged by a finger $m$, carried by the pulley B for the operation of the pawl-and-ratchet mechanism $h\ d$ and the rotation of the pinion P, as will appear from the description of the operation of this tightening mechanism, which will now be given, the finger $m$ constituting the mechanism for operating the tightening mechanism in the present case. So long as no slip occurs between the disk E and the pulley B, as before remarked, the tightening mechanism—i. e., the star-wheel S and pawl and ratchet $h\ d$—will not be operated to increase the friction between the pressing-surfaces of the clutch. As soon, however, as such slip occurs and the disk E, carrying star-wheel S, rotates at a less speed than that of the driving-pulley B, the finger $m$ will at each revolution of the pulley B past the disk E engage a spoke in the star-wheel S and rock or partially rotate the latter upon the sleeve $s$ a distance equal to the space between two spokes. As the wheel or lever S is thus operated its pawl $h$, engaging the ratchet $d$, will rotate the shaft $p$ and pinion P upon the inner side of the disk E in the direction of the arrow, Fig. 1. As the pinion P is thus rotated it will by its engagement with the cog-wheel I upon the inner side of the disk E, as when manipulated by hand, as before described, rotate said wheel, which in turn will cause the ring G, threaded upon its interior, to travel outward away from the inner face of the disk E, carrying with it the bolts 6, connected to the levers J, the pressure of which latter levers upon the ring F and the pressure of the cog-wheel I against the disk E toward ring F being thereby correspondingly increased and the disk E, plate C, and ring F thus caused to more tightly compress between them the friction-rings $f$. This operation of the star-wheel and connected mechanism will continue so long as any slip exists between the pressing-surfaces and the speed of the driven member of the clutch is less than that of the driving member, the finger $m$ engaging a spoke in the wheel S at each revolution of the pulley B past the disk E, as before remarked. As soon as the slip ceases the wheel S will travel with the finger m. It will thus be seen that the friction between the pressing-surfaces is increased by the tightening mechanism only to such an extent as is necessary for the driving of the load upon the shaft, the initial friction between such surfaces, regulated by the adjusting and clamping mechanisms, determining the point at which such operation shall begin, and the load itself determining the point at which it shall cease, the clutch being thus automatically adjusted and the friction created between the pressing-surfaces proportioned to the load upon the shaft.

To unclutch the pulley B and shaft A, the sleeve H is moved inward toward the disk E, this movement breaking down the toggle-levers, returning their bowls or rollers 4 to the recesses g' and relieving the pressing-surfaces from the pressure of the levers J, when the shaft A will cease to rotate with the pulley B. The wheel S, however, still remaining in the line of rotation of the finger m, would, were no means provided for moving it out of this position upon this movement of the toggle-levers, still be operated by said finger to again operate the clamping mechanism and bring the disk E, plate C, and ring F into engagement. Means, however, are provided in the present case for this purpose, consisting, briefly stated, of a lever L, fulcrumed on the disk E and at its outer end engaging the longitudinally-movable sleeve s, and a rod R, pivoted to the sleeve H and provided with means for engaging the inner end of lever L upon the inward movement of the sleeve H and by this engagement rocking the outer end of said lever outward away from ring F and with it the sleeve s, the lever S during this movement of sleeve s moving with it out of the path of movement of pin m. This mechanism and its operation will now be more particularly described. The sleeve s, carrying the star-wheel S and the pawl-and-ratchet mechanism, is, as just intimated, capable of movement longitudinally of the shaft p, a pin p' limiting the outward movement of said sleeve, its inward movement being limited by the ring F. Upon the inner end of the sleeve s is loosely mounted a collar k, provided with pins entering slots in the lever L, which, as shown, is bifurcated and straddles the sleeve s. The lever L is fulcrumed at l upon the disk E and extends inwardly toward the hub of said disk, with its inner end in position to be engaged by rod R, which is connected pivotally to the sleeve H, and, like the latter, is capable of movement to and from the disk E, an opening x in the latter receiving the inner end of the rod R. The rod R is provided with a lug t, which upon the inward movement of said rod by the sleeve H from the position shown in the drawings will engage the inner end of the lever L, as shown, and rock the same inward against the face of the disk E. The rod R is also provided at its end with a cam u, resting against the outer wall of the opening x in the disk E, a spring y upon the hub of said disk engaging the inner side of the rod R and holding said cam normally in this position. The rod R is also provided with a lug v, which, as will hereinafter appear, upon the completion of the inward movement of the sleeve H engages the inner end of the lever L, which has been rocked inward against the face of the disk E and holds it in that position.

The operation of this mechanism is as follows: During the first part of the movement of the sleeve H inwardly toward the disk E the lug t upon the rod R, engaging the inner end of the lever L, will rock the same inwardly toward the disk E, the outer end of said lever, and with it the sleeve s, wheel S, and pawl-and-ratchet mechanism, being moved correspondingly outward away from said disk. While the rod R is being thus moved its cam u, engaging the outer wall of the opening x, forces the rod R inwardly toward the opposite wall of the opening against the pressure of the spring y until the rod R has been moved sufficiently to complete the movement inward of the inner end of the lever L, at which time the cam u will have advanced sufficiently into the opening x to disengage the lug t from the end of said lever. The movement of the sleeve H beyond this point will not affect the lever L, the lug t being out of engagement therewith. When the rod R has been thus moved by the cam u, it will have advanced sufficiently into the opening x to bring its lug v into position to engage the inner end of the lever L to hold the same against the face of the disk E. It will be seen from the foregoing that the disengagement of the tightening mechanism is effected somewhat in advance of the completion of the inward movement of the sleeve H to break down the toggle-levers and before the disk E, plate C, and ring F are so affected by such movement that slip will occur between them. When the sleeve H is moved outward from the disk E to clamping position, the return of the clamping devices and tightening mechanism to operative position takes place in reverse order the toggle-levers being positioned slightly in advance of the tightening mechanism. As the sleeve H is moved outward for this purpose it passes through the opening x without imparting any movement to the lever L until the outer edge of the cam u strikes against the inner end of said lever, which will occur shortly after the engagement of the disk E, plate C, and ring F by the straightening out of the toggle-levers. A spring z is interposed between the lever L and the cam u, which upon the completion of the outward movement of the rod R, if the lever L has not been properly positioned, will continue the movement of said lever to proper position, as shown in Fig. 3.

In the figures which have been thus far described the various mechanisms are shown in their preferred forms. Modificationss may be made in the construction and arrangement of these mechanisms without departing from the present invention. A few such modifications are illustrated in Figs. 5 to 9, which will now be described.

It will be noted that in Figs. 1 to 3 the tightening mechanism is so positioned as to be operated only upon the movement of the pulley B in one direction, this mechanism being inoperative upon the movement of the pulley in the opposite direction.

In Figs. 5 to 9 are illustrated modifications in which the tightening mechanism is so positioned with relation to the pulley B as to be operated upon the movement of the pulley B in either direction. The constructions of these latter views form the subject-matter of an application filed by me April 8, 1892, Serial No. 428,316, and need, therefore, be only briefly described herein.

In the modification illustrated in Figs. 5 and 6 the clamping devices, sleeve H, and disk E, plate C, and ring F are constructed and arranged as in the preceding figures. In this modification, however, the pinion P engages the cog-wheel I upon its inner periphery, as best shown in Fig. 5. In this case, also, the pinion P is not rotated by a lever of the star-wheel form upon the outer face of the disk E, as in the preceding figure, but by a lever S', mounted upon an extension of the shaft $p$ upon the inner face of said disk and engaged once in every revolution of the driving member past the driven member by a cam or projection $m'$, formed upon the hub of the pulley B, as shown in Fig. 6. The lever S' carries a pawl $h$, which engages a ratchet $d$ upon the shaft $p$, and the inner end of the lever S' is curved, as shown, so as to be operated by the cam $m'$ upon the rotation of the pulley B, in either direction. The lever S' is also provided, as in the preceding figures, with an adjusting mechanism for throwing it into and out of operative position with relation to the cam $m'$. The construction of this adjusting mechanism is substantially the same as that of Figs. 7, 8, and 9, which will presently be described.

Figures 7, 8, 9:
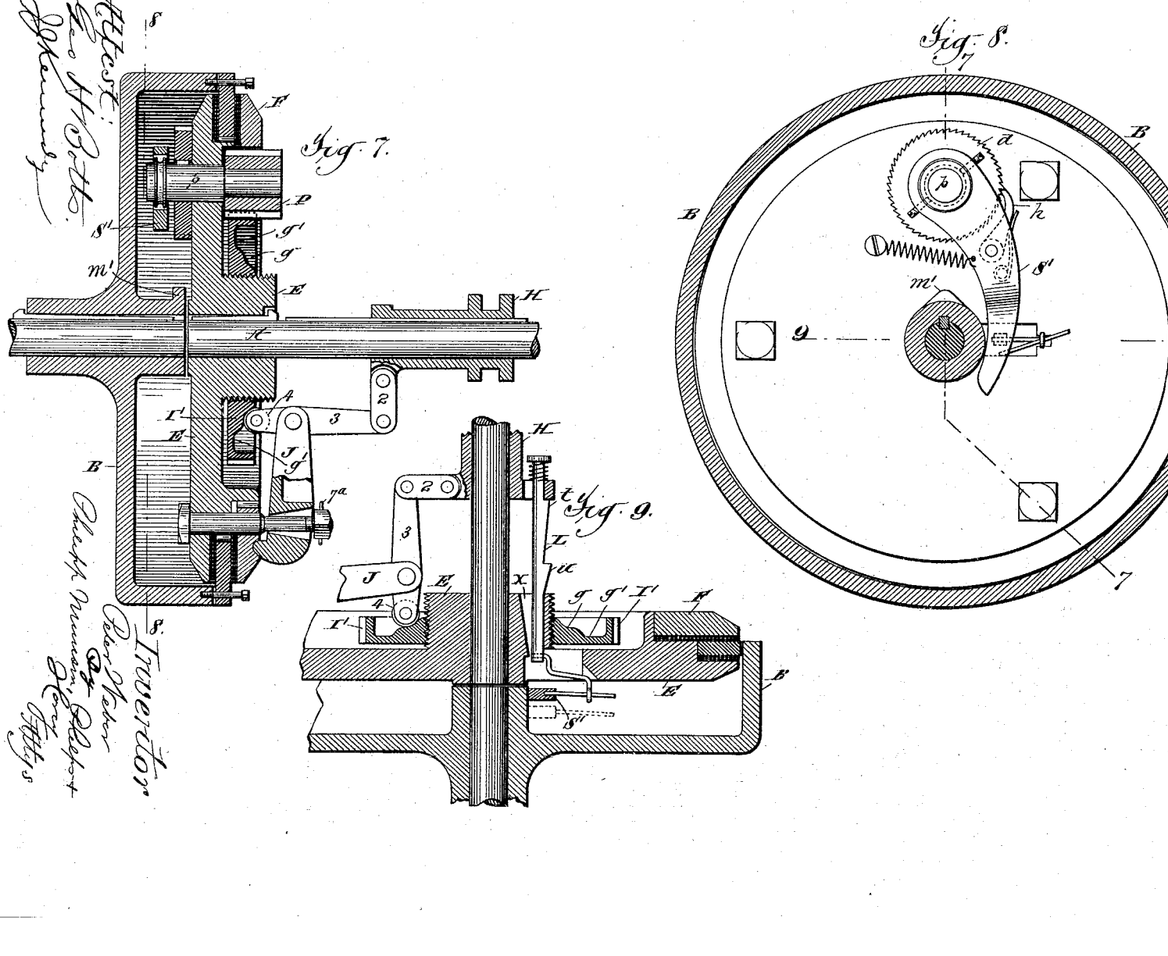
Figs. 7, 8, and 9 illustrate a modification in the clamping mechanism which will also be hereinafter referred to, Fig. 7 being a section on the line 7 7 of Fig. 8, and the latter figure a section on the line 8 8 of Fig. 7.

In the construction illustrated in Figs. 7, 8, and 9 the clamping mechanism and pressing-surfaces are constructed and arrranged substantially as in the preceding figures. In these latter views, however, the arms 3 are engaged in their clamping position—i. e., the position in which they are shown—by a cam $g$, as in the preceding figures; but in these views this cam is formed in the face of a cog-wheel I', the equivalent of the cog-wheel I of the preceding figures, which is threaded and adapted to move outwardly upon the hub of the disk E and to rock the inner ends of the levers J outwardly from the face of the disk, and to thus cause their outer ends to more strongly bear against the ring F. The cog-wheel I' is engaged by the pinion P, as in the preceding figures, which pinion is in turn rotated by a pawl-and-ratchet mechanism operated from a lever S' upon the inner face of the disk E, which lever, as in Figs. 5 and 6, is engaged by a cam or projection $m'$ upon the hub of the pulley B. In the modification now described the outer ends of the levers are moved inwardly against the ring F by the outward movement of their inner ends, effected by the travel outward of the cog-wheel I' upon the hub of the disk E. The levers J and the ring F in these latter views are of slightly-different construction from the previous figures, the annular rib $j$ and radial ribs $e$ of those figures being omitted, the outer ends of the levers J in the present case engaging notches in the face of the ring F, as best shown in Fig. 7. The lever S' of these latter figures is provided with an adjusting mechanism consisting of a cam-rod L, carried by the sleeve H and passing through an opening $x$ in the disk E and at its inner end connected with the lever S'. The rod L, upon the inward movement of the sleeve H, passes through the opening $x$ until its cam $u$ has been advanced sufficiently therein to disengage the shoulder $t$ from the sleeve H, the movement of the latter beyond this point not affecting the rod L or the lever S', which latter has been moved out of the line of rotation of the cam $m'$, as shown by dotted lines in Fig. 9.

The constructions of Figs. 5 to 9 are shown herein merely for the purpose of illustrating a few of the many modifications which may be made in the present invention. These constructions, though included broadly in the claims of this specification, form the subject-matter of my companion application, before referred to.

In all of the figures of the drawings the tightening mechanism of the clutch is shown upon the driven member and as operated by the driving member. While, as before stated, this is the preferred construction, my invention includes as well the operation of this mechanism from the driven member, the tightening mechanism in such case being located upon the driving member of the clutch. So, also, my invention as to this feature is not to be limited to the particular devices shown—i. e., finger $m$ or cam $m'$—for operating this tightening mechanism, my invention including, broadly, any other suitable devices whereby this mechanism located upon one member of the clutch is operated from the other when the speed of the driven member is less than that of the driving member.

It is also to be understood that the term "clamping mechanism" as employed herein in conjunction with the tightening and the adjusting mechanisms is intended to include not only such a clamping mechanism as shown, in which a sleeve H or equivalent mechanism is employed for shifting said clamping mechanism to clamping and unclamping positions, but also any other suitable form of clamping mechanism from which such shifting mechanism is omitted or any suitable form of clamping mechanism specially provided for operation solely by said tightening mechanism or said adjusting mechanism.

It is also to be understood that the term "driving member" includes not only a pulley, as B, but also any driving mechanism, such as a shaft.

Such obvious modifications and changes, which are referred to herein merely as examples of some modifications and changes which may be made in the apparatus, as well as others which may be made herein, are included in the present invention.

It is to be understood that where the tightening mechanism is described as operated when the speed of the driven member is less than that of the driving member it is intended to include the operation of that mechanism when the driven member is in a state of rest.

It is also to be understood that the improvements constituting the present invention are not to be limited to the particular class of clutch in connection with which they are illustrated in the drawings and have been described herein.

What I claim is—

1. The combination, with the driving and driven members of a friction-clutch and mechanism for clamping said two members, of tightening mechanism upon one member and operated from the other member when the speed of the driven member is less than that of the driving member and connections engaging said clamping mechanism and operated by said tightening mechanism for operating said clamping mechanism to increase the friction between the two members of the clutch, substantially as described.

2. The combination, with the driving and driven members of a friction-clutch, and mechanism for clamping said two members, and mechanism for shifting said clamping mechanism to and from clamping position, of tightening mechanism upon one member and operated from the other member when the speed of the driven member is less than that of the driving member and connections engaging said clamping mechanism and operated by said tightening mechanism for operating and continuing the clamping movement of said clamping mechanism begun by its shifting mechanism to increase the friction between the two members of the clutch, substantially as described.

3. The combination, with the driving and driven members of a friction-clutch and mechanism for clamping said two members, of tightening mechanism upon one member and operated from the other member when the speed of the driven member is less than that of the driving member, connections engaging said clamping mechanism and operated by said tightening mechanism for operating said clamping mechanism to increase the friction between the two members of the clutch, and means for rendering said tightening mechanism inoperative when the two members are unclutched, substantially as described.

4. The combination, with the driving and driven members of a friction-clutch and mechanism for clamping said two members, of tightening mechanism upon one member and operated from the other member when the speed of the driven member is less than that of the driving member, connections engaging said clamping mechanism and operated by said tightening mechanism for operating said clamping mechanism to increase the friction between the said two members of the clutch, and means for rendering said tightening mechanism inoperative when the two members are unclutched and for restoring it to operative position when said members are clutched, substantially as described.

5. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism for operating said clamping mechanism to increase the friction between the two members of the clutch, and means for rendering said tightening mechanism inoperative during the first part of the movement to unclamping position of said clamping mechanism, substantially as described.

6. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism for operating said clamping mechanism to increase the friction between the two members of the clutch, and means for rendering said tightening mechanism inoperative during the first part of the movement to unclamping position of said clamping mechanism and for restoring it to operative position during the latter part of the movement to clamping position of said clamping mechanism, substantially as described.

7. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism for operating said clamping mechanism to increase the friction between the two members of the clutch, and connections operated by said shifting mechanism and engaging said tightening mechanism for rendering the latter inoperative during the movement to unclamping position of said shifting mechanism, substantially as described.

8. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism for operating said clamping mechanism to increase the friction between the two members of the clutch, and connections operated by said shifting mechanism and engaging said tightening mechanism for rendering the latter inoperative during the movement to unclamping position of said shifting mechanism and restoring said tightening mechanism to operative position upon the movement to clamping position of said shifting mechanism, substantially as described.

9. The combination, with the driving and driven members of a friction-clutch and mechanism for clamping said two members, of a pawl-and-ratchet mechanism and connections upon one member and operated from the other member when the speed of the driven member is less than that of the driving member and connections engaging said clamping mechanism and operated by said pawl-and-ratchet mechanism for operating said clamping mechanism to increase the friction between the two members of the clutch, substantially as described.

10. The combination, with the driving and driven members of a friction-clutch and mechanism for clamping said two members, of a pinion and connections upon one member and operated from the other member when the speed of the driven member is less than that of the driving member and connections engaging said clamping mechanism and operated by said pinion for operating said clamping mechanism to increase the friction between the two members of the clutch, substantially as described.

11. The combination, with the driving and driven members of a friction-clutch and mechanism for clamping said two members, of a pinion, a pawl-and-ratchet mechanism upon one member and operated from the other member when the speed of the driven member is less than that of the driving member for rotating said pinion, and connections engaging said clamping mechanism and operated by said pinion for operating said clamping mechanism to increase the friction between the two members of the clutch, substantially as described.

12. The combination, with the driving and driven members of a friction-clutch and mechanism for clamping said two members, of a pinion, a pawl-and-ratchet mechanism upon one member and operated from the other member when the speed of the driven member is less than that of the driving member for rotating said pinion, and gearing engaging said clamping mechanism and operated by said pinion for operating said clamping mechanism to increase the friction between the two members of the clutch, substantially as described.

13. The combination, with the driving and driven members of a friction-clutch and mechanism for clamping said two members, of a pinion, a pawl-and-ratchet mechanism upon one member and operated from the other member when the speed of the driven member is less than that of the driving member for rotating said pinion, and a cog-wheel engaging said clamping mechanism and operated by said pinion for operating said clamping mechanism to increase the friction between the two members of the clutch, substantially as described.

14. The combination, with the driving and driven members of a friction-clutch and mechanism for clamping said two members, of a pinion, a pawl-and-ratchet mechanism upon one member and operated from the other member when the speed of the driven member is less than that of the driving member for rotating said pinion, a cog-wheel engaging the clamping mechanism and operated by said pinion, and a ring threaded on said cog-wheel and connected to said clamping mechanism and movable upon said cog-wheel upon the rotation of the latter for operating said clamping mechanism to increase the friction between the two members of the clutch, substantially as described.

15. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism, a rod operated by and simultaneously with the movement of said shifting mechanism and engaging said tightening mechanism for throwing it into or out of operative position, and a cam for disengaging said rod from said tightening mechanism before the completion of the movement to unclamping position of said shifting mechanism, substantially as described.

16. The combination, with the driving and driven members of a friction-clutch, mechanism for clamping said two members, and mechanism for shifting said clamping mechanism to clamping and unclamping positions, of tightening mechanism upon one member and operated from the other member when the speed of the driven member is less than that of the driving member, connections engaging said clamping mechanism and operated by said tightening mechanism, a rod operated by and simultaneously with the movement of said shifting mechanism and engaging said tightening mechanism for throwing it into or out of operative position, a cam for disengaging said rod from said tightening mechanism before the completion of the movement to unclamping position of said shifting mechanism and holding said rod out of engagement therewith during the fore part of the return or clamping movement of said shifting mechanism, and means for continuing and completing the movement to operative position of said tightening mechanism independently of said shifting mechanism, substantially as described.

17. The combination, with the driving and driven members of a friction-clutch and mechanism for clamping said two members, of tightening mechanism upon one member and operated from the periphery of the other member when the speed of the driven member is less than that of the driving member, and connections engaging said clamping mechanism and operated by said tightening mechanism for operating said clamping mechanism to increase the friction between the two members of the clutch, substantially as described.

18. The combination, with the driving and driven members of a friction-clutch and mechanism for clamping said two members, of a tightening-lever pivoted upon one member and operated from the other member when the speed of the driven member is less than that of the driving member, and connections engaging said clamping mechanism and operated by said tightening-lever for operating said clamping mechanism to increase the friction between the two members of the clutch, substantially as described.

19. The combination, with the driving and driven members of a friction-clutch and mechanism for clamping said two members, of a tightening-lever pivoted upon one member and operated from the periphery of the other member when the speed of the driven member is less than that of the driving member, and connections engaging said clamping mechanism and operated by said tightening-lever for operating said clamping mechanism to increase the friction between the two members of the clutch, substantially as described.

20. The combination, with the clamping mechanism of a friction-clutch, of the cog-wheel I upon one member, ring G, threaded upon said cog-wheel and connected to said clamping mechanism, pinion P, engaging said cog-wheel, and mechanism engaging said pinion and operated from the other member of the clutch for rotating said pinion, substantially as described.

21. The combination, with the clamping mechanism of a friction-clutch, of the cog-wheel I upon one member, ring G, threaded upon said cog-wheel and connected to said clamping mechanism, pinion P, engaging said cog-wheel, pawl-and-ratchet mechanism $h\ d$, and a lever operated from the other member for operating said pawl-and-ratchet mechanism, substantially as described.

22. The combination, with the clamping mechanism of a friction-clutch, of a lever upon one member and operated from the other member, pawl-and-ratchet mechanism $h\ d$, operated by said lever, and connections between said pawl-and-ratchet mechanism and said clamping mechanism, substantially as described.

23. The combination, with the clamping mechanism of a friction-clutch, of a lever upon one member, finger $m$ upon the other member for operating said lever, pawl-and-ratchet mechanism operated by said lever, pinion P, rotated by said pawl-and-ratchet mechanism, and connections between said pinion and the clamping mechanism of the clutch, substantially as described.

24. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever S, carried by said sleeve and operated from the other member of the clutch, connections between sleeve H and sleeve $s$ for moving said lever to and out of operative position upon the movement to clamping and unclamping position, respectively, of the sleeve H, and connections between shaft $p$ and the clamping mechanism of the clutch, substantially as described.

25. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever L, fulcrumed upon the clutch and engaging said sleeve $s$, lever S, carried by the latter and operated from the other member of the clutch, rod R, connected to sleeve H and engaging lever L for moving lever S to and out of operative position upon the movement to clamping and unclamping position, respectively, of the sleeve H, and connections between shaft $p$ and the clamping mechanism of the clutch, substantially as described.

26. The combination, with the clamping mechanism of a friction-clutch and sleeve H for shifting said clamping mechanism to and from clamping position, of the shaft $p$ upon one member of the clutch, lever S, movable longitudinally of said shaft and operated from the other member of the clutch, lever L, fulcrumed upon the clutch, connections between said lever and lever S, rod R, connected to sleeve H, lug $t$ upon said rod engaging lever L for moving lever S out of operative position upon the movement to unclamping position of the sleeve H, cam $u$ upon said rod and means coacting therewith for disengaging lug $t$ from lever L before the unclamping movement of sleeve H is completed, and connections between shaft $p$ and the clamping mechanism of the clutch, substantially as described.

27. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever L, fulcrumed upon the clutch and engaging said sleeve $s$, lever S, carried by the latter and operated from the other member of the clutch, rod R, connected to sleeve H, lug $t$ upon said rod engaging lever L for moving lever S out of operative position upon the movement to unclamping position of the sleeve H, cam $u$ upon said rod and means coacting therewith for disengaging lug $t$ from lever L before the unclamping movement of sleeve H is completed, and connections between shaft $p$ and the clamping mechanism of the clutch, substantially as described.

28. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever L, fulcrumed upon the clutch and engaging said sleeve $s$, lever S, carried by the latter and operated from the other member of the clutch, rod R, connected to sleeve H, lug $t$ upon said rod engaging one side of lever L for moving lever S out of operative position upon the movement to unclamping position of the sleeve H, cam $u$ upon said rod and means coacting therewith for disengaging lug $t$ from lever L before the unclamping movement of sleeve H is completed, means coacting with rod R for bringing said cam into engagement with the opposite side of lever L during the latter part of the return or clamping movement of sleeve H to restore lever S to operative position, and connections between shaft $p$ and the clamping mechanism of the clutch, substantially as described.

29. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever L, fulcrumed upon the clutch and engaging said sleeve $s$, lever S, carried by the latter and operated from the other member of the clutch, rod R, connected to sleeve H, lug $t$ upon said rod engaging one side of lever L for moving lever S out of operative position upon the movement to unclamping position of the sleeve H, cam $u$ upon said rod, and means coacting therewith for disengaging lug $t$ from lever L before the unclamping movement of sleeve H is completed, means coacting with rod R for bringing said cam into engagement with the opposite side of lever L during the latter part of the return or clamping movement of sleeve H to restore lever S to operative position, spring $z$ between cam $u$ and lever L, and connections between shaft $p$ and the clamping mechanism of the clutch, substantially as described.

30. The combination, with the clamping mechanism of a friction-clutch and sleeve H for shifting said clamping mechanism to and from clamping position, of the shaft $p$ upon one member of the clutch, sleeve $s$, mounted upon and movable longitudinally of said shaft, lever L, fulcrumed upon the clutch and engaging said sleeve $s$, lever S, carried by the latter and operated from the other member of the clutch, rod R, connected to sleeve H, lug $t$ upon said rod engaging one side of lever L for moving lever S out of operative position upon the movement to unclamping position of the sleeve H, spring $y$ for holding said rod normally in position for such engagement, cam $u$ upon said rod, and means coacting therewith for disengaging lug $t$ from lever L before the unclamping movement of sleeve H is completed, means coacting with rod R for bringing said cam into engagement with the opposite side of lever L during the latter part of the return or clamping movement of sleeve H to restore lever S to operative position, spring $z$ between cam $u$ and lever L, and connections between shaft $p$ and the clamping mechanism of the clutch, substantially as described.

31. The combination, with the clamping mechanism of a friction-clutch, of the disk E, provided with cam $g$, engaging said clamping mechanism in its operative position, and with recess $g'$ at the base of the cam for receiving the bearing portions of said clamping mechanism in its inoperative position, substantially as described.

32. The combination, with the toggle mechanism of a clutch, of the ribs $e$, formed in the face of one of the members and embracing the bearing portions of said levers, and cams $g$ between said ribs, substantially as described.

33. The combination, with the toggle-levers of a friction-clutch, of the disk E, provided with cams $g$, engaging said toggle-levers in the operative position, and with recesses $g'$ at the base of the cam for receiving the bearing portions of said levers in their inoperative positions, substantially as described.

34. The combination, with the disk E, having cams $g$ and recesses $g'$, of the levers J, arms 2 3, and the rollers 4 upon the arms 3, substantially as described.

35. The combination, with the driving and driven members of a friction-clutch and a plurality of clamping devices for clamping said two members, of tightening mechanism upon one member and operated from the other member when the speed of the driven member is less than that of the driving member, a friction-adjusting wheel, connections engaging said wheel and operated by said tightening mechanism, and threaded connections between said wheel and all of said clamping devices to increase the friction between the two members of the clutch, substantially as described.

36. The combination, with the driving and driven members of a friction-clutch and a plurality of clamping devices for clamping said two members, of a pinion and connections upon one member and operated from the other member when the speed of the driven member is less than that of the driving member, a friction-adjusting cog-wheel rotated by said pinion, and threaded connections between said cog-wheel and all of said clamping devices for simultaneously operating all of said devices to increase the friction between the two members of the clutch, substantially as described.

37. In a friction-clutch, the combination, with a plurality of clamping devices, of the disk E, cog-wheel I, journaled on said disk, and ring G, connected to said clamping devices and threaded upon and movable axially of said cog-wheel upon the rotation of the latter to adjust said clamping devices, substantially as described.

38. In a friction-clutch, the combination, with a plurality of clamping devices, of the disk E, cog-wheel I, journaled on said disk, ring G, connected to said clamping devices and threaded upon and movable axially of said cog-wheel upon the rotation of the latter to adjust said clamping devices, and pinion P and shaft $p$ for rotating said cog-wheel, substantially as described.

39. In a friction-clutch, the combination, with a plurality of clamping devices, of the disk E, cog-wheel I, journaled on said disk, and ring G, connected to said clamping devices and threaded upon and movable axially of said cog-wheel upon the rotation of the latter to adjust said clamping devices, pinion P and shaft $p$ for rotating said cog-wheel, and washer $w$, connected to disk E and engaging cog-wheel I to prevent its movement axially of the clutch, substantially as described.

40. The combination, with pulley B, its plate C, and disk E and ring F, embracing said plate, of the rib $j$ upon the outer face of the ring F in line with plate C, cog-wheel I upon the inner face of the disk E and provided with an extension in line with the rib $j$, clamping mechanism connected with said cog-wheel and engaging rib $j$, and means for shifting said cog-wheel to clamping and unclamping positions into and out of engagement with rib $j$, substantially as described.

In testimony whereof I have hereunto set my hand in the presence of two subscribing witnesses.

PETER WEBER.

Witnesses:
MARLIN J. INSULL,
WM. C. MARLETTE.